(12) United States Patent
Karani et al.

(10) Patent No.: US 11,875,360 B2
(45) Date of Patent: Jan. 16, 2024

(54) METHOD AND SYSTEM FOR GENERATING INSIGHTS REGARDING A PARTY IN RESPONSE TO A CALL

(71) Applicant: Salesforce, Inc., San Francisco, CA (US)

(72) Inventors: Vijay Karani, Saratoga, CA (US); Jayant Tyagi, Castro Valley, CA (US)

(73) Assignee: Salesforce, Inc.

( * ) Notice: Subject to any disclaimer, the term of this patent is extended or adjusted under 35 U.S.C. 154(b) by 39 days.

(21) Appl. No.: 17/449,241

(22) Filed: Sep. 28, 2021

(65) Prior Publication Data

US 2022/0012748 A1 Jan. 13, 2022

Related U.S. Application Data

(63) Continuation of application No. 15/873,966, filed on Jan. 18, 2018, now Pat. No. 11,170,381.

(51) Int. Cl.
| | |
|---|---|
| *G06Q 30/01* | (2023.01) |
| *H04M 3/42* | (2006.01) |
| *G06F 21/62* | (2013.01) |

(52) U.S. Cl.
CPC ......... *G06Q 30/01* (2013.01); *G06F 21/6245* (2013.01); *H04M 3/4217* (2013.01); *H04M 3/42068* (2013.01)

(58) Field of Classification Search
None
See application file for complete search history.

(56) References Cited

U.S. PATENT DOCUMENTS

| | | |
|---|---|---|
| 5,983,227 A | 11/1999 | Nazem et al. |
| 6,216,133 B1 | 4/2001 | Masthoff |
| 6,236,978 B1 | 5/2001 | Tuzhilin |
| 6,288,717 B1 | 9/2001 | Dunkle |
| 6,411,949 B1 | 6/2002 | Schaffer |

(Continued)

OTHER PUBLICATIONS

Askool, S., Nakata, K. A conceptual model for acceptance of social CRM systems based on a scoping study. AI & Soc 26, 205-220 (2011). https://doi.org/10.1007/s00146-010-0311-5. (Last accessed Aug. 22, 2023).*

(Continued)

*Primary Examiner* — Peter Ludwig
*Assistant Examiner* — Donald J Edmonds
(74) *Attorney, Agent, or Firm* — Lorenz & Kopf, LLP

(57) ABSTRACT

Methods and systems are provided for providing an insights page. When data identifying a party of a call is received, a customer relationship management (CRM) application can be launched at a computing device without any further user input, and records that are potentially relevant to the call and that are to potentially be included as part of an insights page of the CRM application can be automatically determined. Some of the records are automatically determined by analyzing CRM information using artificial intelligence technologies. The records can then be ranked in a priority order according to relevance from most relevant to least relevant. The insights page can then be caused to be displayed at a user interface of the computing device without user input with at least some of the records displayed in the priority order as relevant records.

20 Claims, 13 Drawing Sheets

(56) References Cited

U.S. PATENT DOCUMENTS

| | | |
|---|---|---|
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,644,122 B2 | 1/2010 | Weyer et al. |
| 7,668,861 B2 | 2/2010 | Steven |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,991,764 B2 | 8/2011 | Rathod |
| 8,005,896 B2 | 8/2011 | Cheah |
| 8,073,850 B1 | 12/2011 | Hubbard et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 9,020,938 B2 | 4/2015 | Cort et al. |
| 9,058,366 B2 | 6/2015 | Brezina et al. |
| 9,094,515 B2 | 7/2015 | Pickering |
| 2008/0010270 A1 | 1/2008 | Gross |
| 2008/0147487 A1 | 6/2008 | Hirshberg |
| 2008/0209320 A1 | 8/2008 | Mawhinney et al. |
| 2008/0263473 A1 | 10/2008 | Becker et al. |
| 2009/0132345 A1 | 5/2009 | Meyssami et al. |
| 2010/0125502 A1 | 5/2010 | Solomon et al. |
| 2010/0217757 A1 | 8/2010 | Fujioka |
| 2010/0241576 A1 | 9/2010 | Beeri |
| 2011/0209067 A1 | 8/2011 | Bogess et al. |
| 2011/0258204 A1 | 10/2011 | Hubbard et al. |
| 2012/0259785 A1 | 10/2012 | Ha |
| 2012/0290407 A1 | 11/2012 | Hubbard et al. |
| 2013/0198259 A1 | 8/2013 | Krizmanich et al. |
| 2014/0250097 A1 | 9/2014 | Shtilman et al. |
| 2014/0250100 A1* | 9/2014 | Shtilman ................ G06Q 10/00 707/711 |
| 2014/0314225 A1 | 10/2014 | Riahi et al. |
| 2015/0310445 A1* | 10/2015 | Chan ................ G06Q 10/06316 705/7.26 |
| 2015/0334237 A1* | 11/2015 | Pickering ........... G06Q 30/0256 379/265.09 |
| 2016/0291808 A1* | 10/2016 | Wang .................... G06F 16/957 |
| 2016/0353310 A1 | 12/2016 | Gorny |
| 2017/0006161 A9* | 1/2017 | Riahi ..................... H04L 51/02 |
| 2017/0149972 A1 | 5/2017 | Klemm et al. |
| 2017/0220943 A1* | 8/2017 | Duncan ................. G06N 5/04 |

OTHER PUBLICATIONS

Final Office Action for U.S. Appl. No. 12/437,418, dated Apr. 16, 2012.
Final Office Action for U.S. Appl. No. 12/356,429, dated May 2, 2012.
Notice of Allowance for U.S. Appl. No. 12/819,402, dated May 14, 2012.
Non-Final Office Action for U.S. Appl. No. 13/453,802, dated Jun. 8, 2012.
Linear Combination—Wikipedia (http://en.wikipedia.org/wiki/Linear_Combination (accessed Jul. 16, 2012).

* cited by examiner

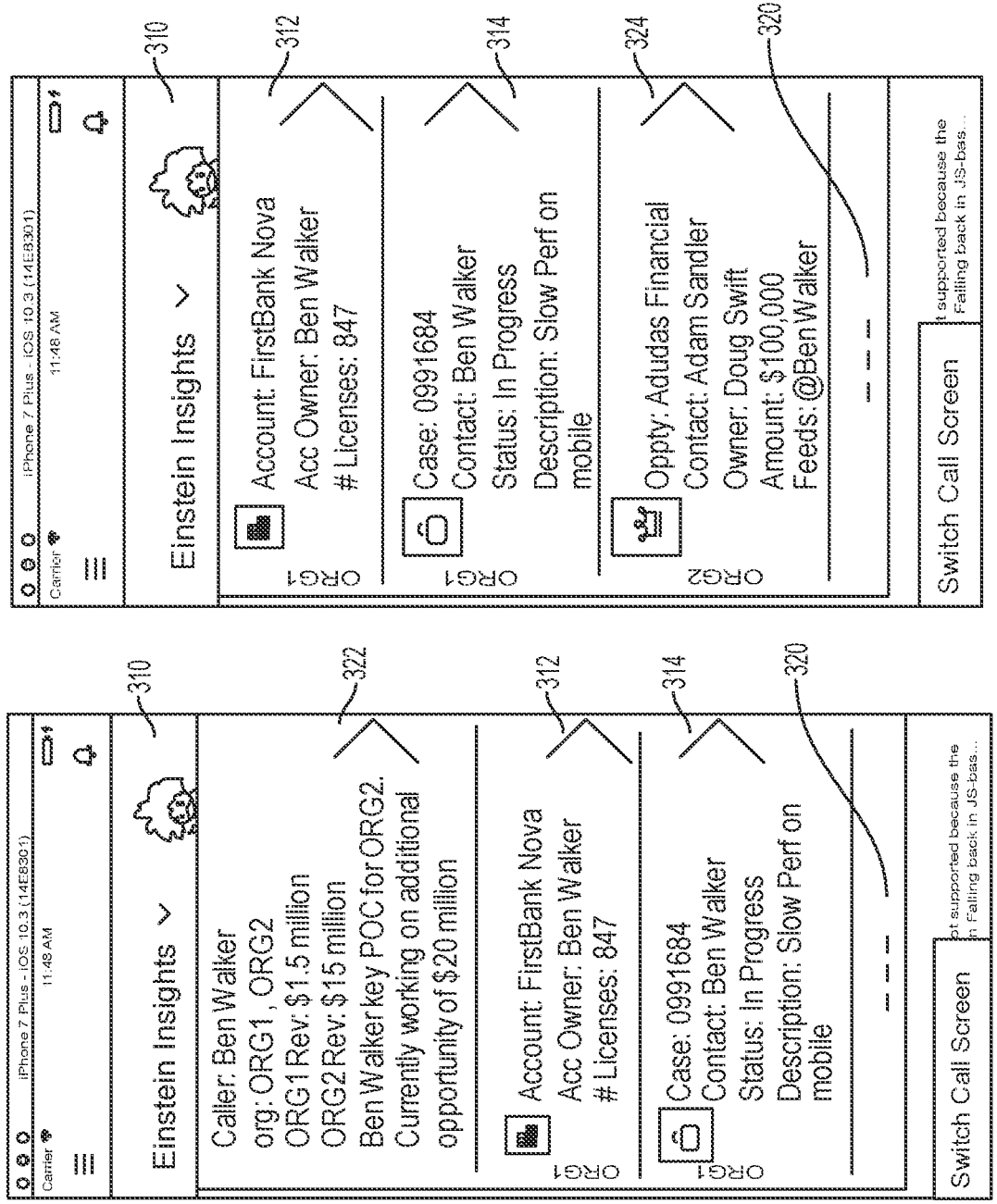

METHOD AND SYSTEM FOR GENERATING INSIGHTS REGARDING A PARTY IN RESPONSE TO A CALL

CROSS-REFERENCE TO RELATED APPLICATION

This application is a continuation of U.S. application Ser. No. 15/873,966 filed Jan. 18, 2018, which is incorporated herein by reference in its entirety.

TECHNICAL FIELD

Embodiments of the subject matter described herein relate generally to customer relationship management applications. More particularly, embodiments of the subject matter relate to a method and system for generating an insight page regarding a party at a customer relationship management application in response to an incoming call from the party or outgoing call made to the party.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Many cloud-based applications are generated based on data that is accessed from storage, and then delivered to a user system such as a mobile device or desktop computer. For example, the Salesforce Mobile platform offered by Salesforce.com provides a customer relationship management application that can provide an end user with sophisticated customer relationship data. Records for each customer can be stored at a server system. The end user can launch the Salesforce Mobile application and submit requests to the server system over a network to access records that are relevant to a particular customer. The server system fetches the relevant records, which can then be presented to the end user via the Salesforce Mobile application to provide the end user with a wealth of information about that particular customer.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3B is another example of a graphical user interface displayed at the mobile communication device during the voice-over-IP call to display a dynamic insights page having an intelligence summary report in accordance with the disclosed embodiments.

FIG. 3C is another example of a graphical user interface displayed at the mobile communication device during the voice-over-IP call to display a dynamic insights page in accordance with the disclosed embodiments.

DETAILED DESCRIPTION

Figure 1:
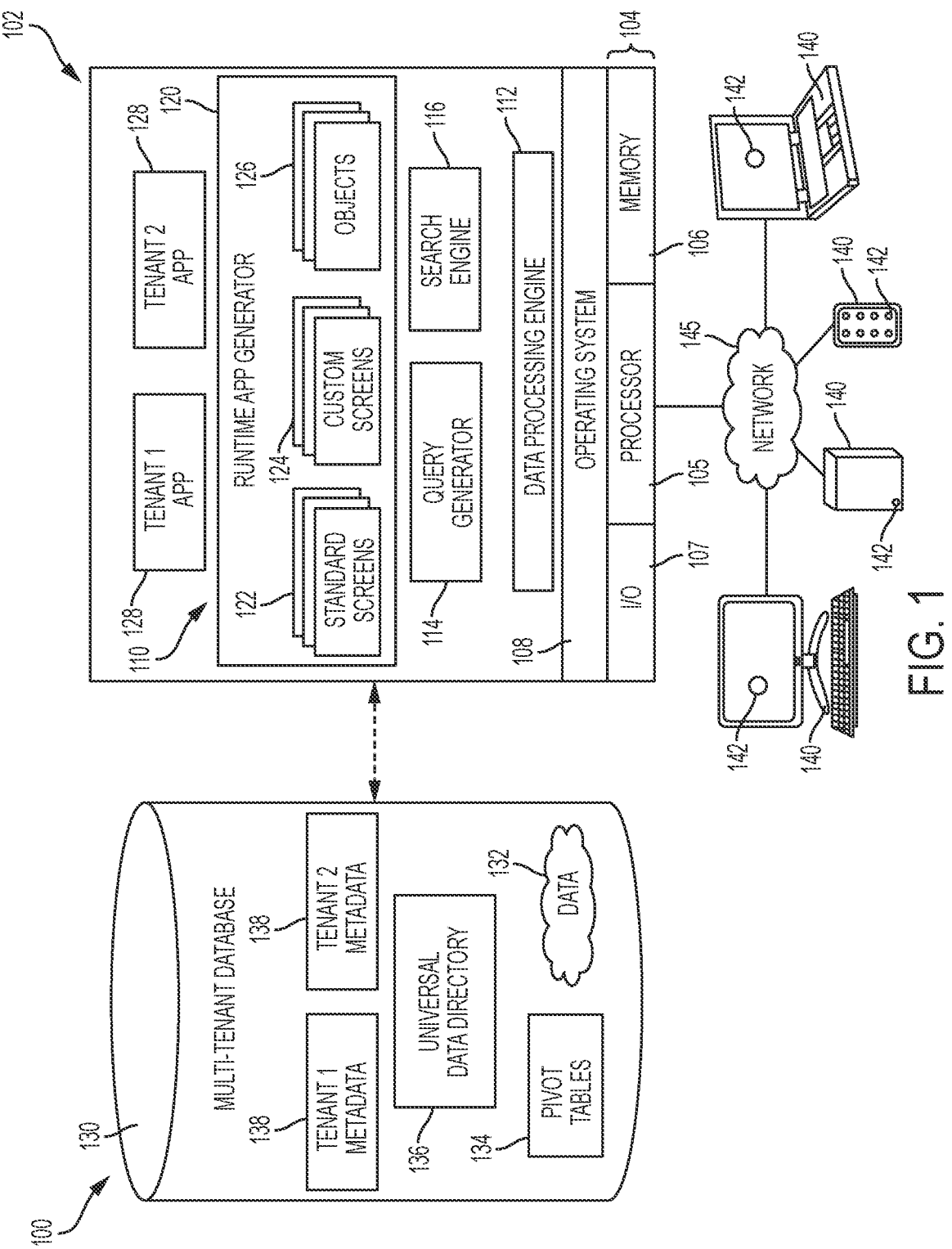
FIG. 1 is a schematic block diagram of an example of a multi-tenant computing environment in which features of the disclosed embodiments can be implemented in accordance with some of the disclosed embodiments.

When an incoming call is received by a callee from a caller (or an outgoing call is made to a callee by a caller), it can be difficult for the callee or caller to access data (e.g., records) that are relevant to the call that is taking place. This is partly due to the fact that the user had to open an application (e.g., a CRM application), search for the data (e.g., records) that are of relevance, and then decide which records are the most important. The process of identifying data (e.g., records) that are relevant to a particular customer and then retrieving that data can be time-consuming, inefficient and difficult to do in real-time. It would be desirable to speed up the process of identifying and accessing records that are relevant for a particular customer to improve user experience. Currently, automated intelligence is not applied in determining which data (e.g., records) are most relevant to a particular caller or callee. It would be desirable to provide improved technologies that can intelligently predict (e.g., probabilistically) which data (e.g., records) are most likely to be of importance, and present the user with an easy way to access those records in real-time when a call is made or received by the user. By applying intelligence when selecting the data (e.g., records) that are presented to a user during the call, a better user experience and more productive call can be achieved by the user especially for certain types of calls such as business or sales calls.

Technologies are provided for providing a "dynamic" insights page that is displayed at a user interface of a computing device (e.g., a mobile communication device) in response to a call. The call can be either an incoming call received by the computing device, or an outgoing call made from the computing device. When an incoming call is received, or when an outgoing call is made, the caller who is making a call and/or the callee that is receiving the call can be identified along with one or more relevant organizations. For example, in one embodiment, identifying information (e.g., a contact name or phone number) can be determined that is associated with the caller and other identifying information can be determined that is associated with the callee. The identifying information can be used to determine a first contact identifier for the caller that is specific to an application platform and one or more first organization identifiers for the caller that are specific to the application platform. The other identifying information can be used to determine a second contact identifier for the callee that is specific to the application platform and one or more second organization identifiers for the callee that are specific to the application platform. The relevant organizations can include any organizations associated with and relevant to the caller or the callee.

A customer relationship management (CRM) application can then be launched at the computing device, and relevant records that are relevant to the call and to be included as part of the insights page can be automatically determined at a server system. In one embodiment, when the call is a regular call, the CRM application can be manually launched in response to a user input. In another embodiment, when the call is a voice-over-IP call, the CRM application can automatically launch after identifying the caller.

In one implementation, that can be used when the call is a VoIP call, the CRM application can execute at the computing device and retrieve the relevant records from the server system that can then be used by the CRM application at the computing device to generate the insights page. In another implementation, that can be used during a regular call, the CRM application can execute at the computing device and request an insights page, and a corresponding CRM application at the server system of a cloud-based application platform, can determine the relevant records and deliver content for the insights page to the computing device, which can then be opened at the CRM application of the computing device. In yet another implementation, that can be used during a regular call or a VoIP call, the CRM application can execute only at the computing device and can determine relevant records that are cached on the computing device, and then generate an insights page at the computing device. This implementation can be useful, for example, when the computing device is unable to communicate with the server system (e.g., poor network connectivity or for some other reason) because it allows an insights page to be generated and displayed using relevant records for a particular organization that are cached on the device.

In one embodiment, records that reference one or more identifiers in a contact profile associated with the caller can be identified as being relevant records. The contact profile associated with the caller comprises one or more of: a contact identifier for the caller and an organization identifier for the caller. Likewise, records that reference one or more identifiers in a contact profile associated with the callee can be identified as being relevant records. The contact profile associated with the callee comprises one or more of: a contact identifier for the callee and an organization identifier for the callee. The relevant records can be ranked in priority order according to order of relevance from most relevant to least relevant. The relevant records can include records that are determined to be relevant to the call from any organization that a user has access privileges to that allow that user to access records. The relevant records can be associated with and related to the caller that was identified, or to the callee that was identified.

In one embodiment, each of the relevant records can be stored within a CRM system and has an object type associated with a particular type of object. Records can include user CRM information. For example, each of the relevant records can be associated with a particular organization, and can be determined at the server system by analyzing CRM information maintained at the CRM system. The CRM information can include records for any type of object (described below), such as an opportunity object, a lead object, a case object, an account object, reports and dashboards. For instance, the records can be associated with at least one of: an opportunity object, a lead object, an account object, etc.

The insights page that is displayed at the user interface of the computing device includes user interface elements for accessing the relevant records. Each user interface element is linked to and selectable to open a relevant record that has been determined to be relevant to the call. Each user interface element can include a summary of the relevant record that is linked to and associated with. In one embodiment, each user interface element functions as a hyperlink that, when selected, causes a new page to open and be displayed that includes the relevant record. The user interface elements can be displayed, for example, in a list view ranked according to a priority order. The insights page that is displayed can also include an intelligence summary report that includes a user interface element that summarizes the highest ranked intelligence information with respect to the caller or the callee, schedule information, habits information, goal information, social media reference information, etc. In one embodiment, the intelligence summary report is a report that can include one or more user interface elements that summarize the highest ranked intelligence information with respect to the caller a call is being received from or the callee who a call is being made to. The intelligence information included can provide one or more of: a contact name for the caller/callee; the organizations that are associated with that caller/callee; information about the organizations that are associated with that caller/callee; information extracted from organization feeds; rating information for the caller/callee that indicates their importance; key details or critical data about the caller/callee extracted from relevant records or other CRM data; information extracted from Internet data sources such as news sites or social media postings. Additionally, in some embodiments, color coding can be applied to the user interface elements that are displayed at the insights page to provide quick way to spot the key records.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 (or server system 102) that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

The server system 102 communicates with user systems 140. The server system 102 includes an application, or application platform that serves applications 128 to user systems. In accordance with the disclosed embodiments, the virtual applications 128 can include an insights application that is used to generate dynamic insights pages that can be displayed at a UI of the user systems 140 when a call is made or received. The user systems 140 or server system 102 can identify one or more relevant organizations, the caller who is making a call and the callee that is receiving the call. As will be explained in greater detail below with reference to FIGS. 2-7, when a user receives an incoming call on their user system, or makes an outgoing call via their user system, the insights application can be launched and used to generate a dynamic insights page that is displayed via a graphical user interface at the user system. In response to the call, the server system 102 can execute the customer relationship management (CRM) application to determine relevant records that are relevant to the call and to be included as part of an insights page that is displayed at the user system 140. The dynamic insights page includes user interface elements that are each linked to a record that is potentially relevant to the call. The user interface elements can be selected for accessing relevant records. Each user interface element is linked to and selectable to open a relevant record that has been determined to be relevant to the call. Each user interface element can include a summary of the relevant record that it is linked to and associated with. In one embodiment, each user interface element functions as a hyperlink that, when selected, causes a new page to open and be displayed that includes the relevant record. The user interface elements can be displayed, for example, in a list view ranked according to a priority order.

Although FIG. 1 illustrates the application being implemented using a cloud-based application or cloud-based application platform, it can also be implemented using any web application, or any client-server application. The application can access data (e.g., records) from an address space of a process. In general, the application can be hosted at the same system as the server system or at a different system than the server system. Depending on the implementation, data can be stored at storage that can be, for example, remote storage (e.g., cloud-based storage) or local storage (e.g., a database of a server system). In some implementations, the insights application can be implemented using cloud-based application platforms, such as, the Salesforce mobile application, Lightning applications (SFX), or any variants thereof. For example, in one embodiment, the application 128 can be a mobile application served by an application platform, such as Salesforce mobile application and used by mobile devices running the Salesforce mobile app.

Objects and Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 3A:
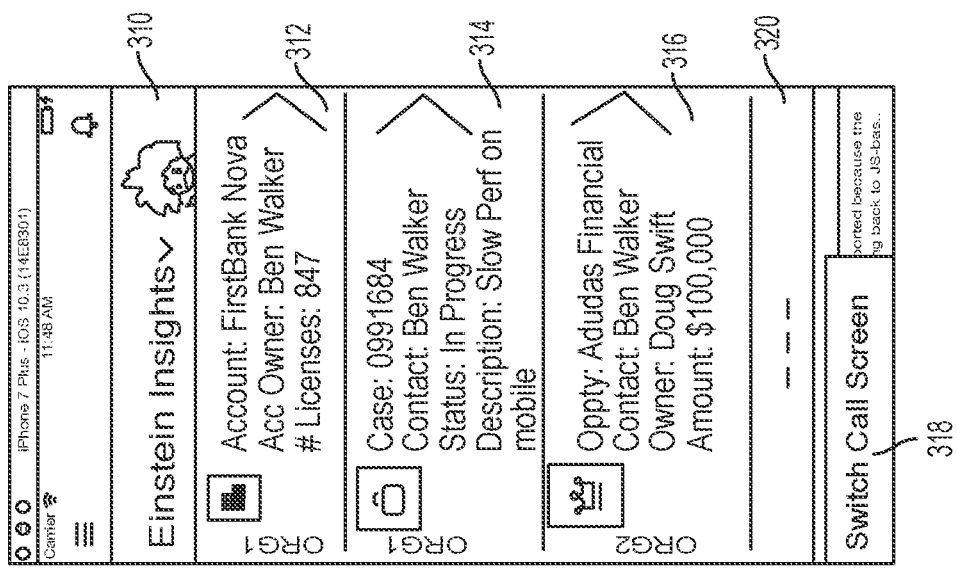
FIG. 3A is another example of a graphical user interface displayed at the mobile communication device during the voice-over-IP call to display a dynamic insights page in accordance with the disclosed embodiments.
Figure 2:
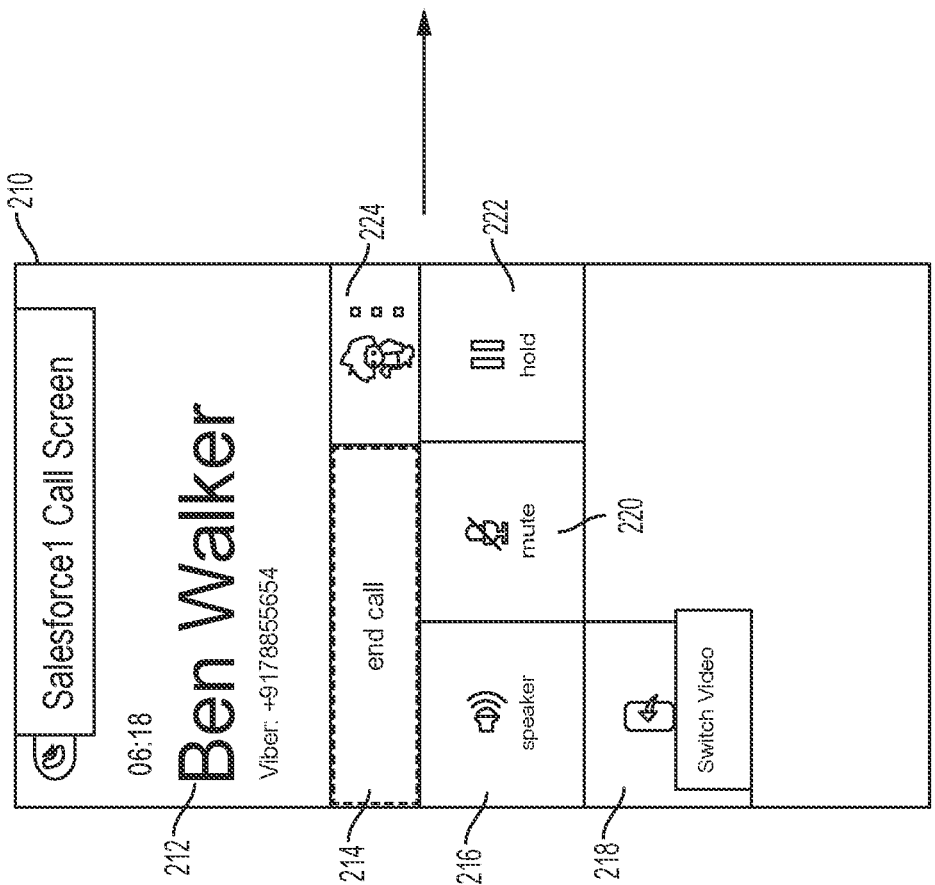
FIG. 2 is an example of a graphical user interface that can be displayed at a mobile communication device when a user receives an incoming voice-over-IP (VoIP) call in accordance with the disclosed embodiments.

FIGS. 2 and 3A-3C show graphical user interfaces that can be displayed at a mobile communication device when a user receives an incoming voice-over-IP (VoIP) call in accordance with the disclosed embodiments. FIG. 2 is an example of a graphical user interface that can be displayed at a mobile communication device when a user receives an incoming voice-over-IP (VoIP) call in accordance with the disclosed embodiments. Referring again to FIG. 2, a graphical user interface is shown that can be displayed at a mobile communication device 140 when the mobile communication device 140 receives an incoming voice-over-IP call in accordance with the disclosed embodiments. In this example, a user receives a voice-over-IP call from a contact named Ben Walker. The graphical user interface can include various user-interface elements including, but not limited to, an end call button 214 that can be selected to end the call, a speaker button 216 that can be selected to place the call on speaker, a switch video button 218 that can be used to switch the incoming voice-over-IP call from a voice call to a video call, a mute button 220 that can be selected to mute the voice-over-IP call, a hold button 222 that can be selected to place the caller of the voice-over-IP call on hold, and. In addition, the graphical user interface also includes an action button 224 that can be used to launch a Salesforce® mobile CRM application (also known as Salesforce mobile and Salesforce1) and display the dynamic insights page 310 as shown in FIG. 3A.

FIG. 3A is another example of a graphical user interface displayed at the mobile communication device during the voice-over-IP call to display a dynamic insights page in accordance with the disclosed embodiments. As will be described in greater detail below, in this embodiment, when a user receives an incoming voice-over-IP call using a voice-over-IP application on their mobile communication device, a dynamic insights page 310 can be displayed via a graphical user interface at the mobile communication device 140. This dynamic insights 310 page can include, for example, user interface elements 312, 314, 316 that are each linked to a record that has been determined to be relevant to the call. Each UI element is selectable to open the particular record that it is linked to and associated with. Each UI element can include a short summary of the record that is linked to and associated with. In one embodiment, each UI element functions as a type of hyperlink that, when selected, causes a new page to open and be displayed that includes the actual record. Although not illustrated in FIG. 3A, in some embodiments, each UI element can also include "sub-UI elements," such as other hyperlinks or action buttons, that can be used to trigger other actions with respect to the record that is associated with that UI element, such as creation of new records or updating the record (e.g., adding further details, for instance, by transcription or manual input).

Further, in some embodiments, the dynamic insights page can also display an intelligence summary report. FIG. 3B is another example of a graphical user interface displayed at the mobile communication device during the voice-over-IP call to display a dynamic insights page having an intelligence summary report in accordance with the disclosed embodiments. FIG. 3B is similar to FIG. 3A except that it includes an intelligence summary report 322. The intelligence summary report 322 shown in FIG. 3B provides the contact name for the caller, the organizations that are associated with that caller, information about the organizations, and a summary of key details about the caller. However, this is one non-limiting example of information that can be included in an intelligence summary report.

In general, an intelligence summary report is a report that can include one or more user interface elements that summarize the highest ranked intelligence information with respect to the caller a call is being received from or the callee who a call is being made to. The intelligence information included can provide one or more of: a contact name for the caller/callee; the organizations that are associated with that caller/callee; information about the organizations that are associated with that caller/callee; information extracted from organization feeds; rating information for the caller/callee that indicates their importance; key details or critical data about the caller/callee extracted from CRM data, CRM related records, CRM Feeds, or other CRM data; information extracted from Internet data sources such as news sites or social media postings.

In the non-limiting example that is illustrated in FIGS. 3A and 3B, the records are associated with the calling party (or "caller") named Ben Walker. However, it should be appreciated that this is not a limitation. The records that are relevant can be associated with any person including the calling party, but do not necessarily have to be associated with the calling party to be considered to be relevant. For instance, the records can also be associated with the party being called (or "callee") or any other records that are determined to be relevant to the call that is currently taking place. In addition, it should be appreciated that the records displayed on the dynamic insights page can come not only from organizations of the caller and/or callee, but can also be extracted from other, different organizations that the caller and callee do not necessarily belong to, but that the callee has permission or privileges to access. In this regard, the records can be pulled from any organization that the user has been given privilege to access. The records can be associated with any person who belongs to those organizations including, but not limited to, the party being called and/or the party a call is being received from, or any other party including those who are not even part of the call as will be described below with reference to FIG. 3C.

Referring again to FIG. 3A, the user interface elements 312, 314, 316 that are displayed via the dynamic insights page 310 are each linked to a record that has been determined to be relevant to the call taking place. In the non-limiting embodiments shown in FIG. 3A, the UI elements are displayed in a "list" view; however, it should be appreciated that the UI elements can be displayed in other ways or formats to present a quick summary of relevant records and allow for easy selection and scrolling operations to be performed by the end user (e.g., one finger operations). The list view that is illustrated can be customized by the user to change the layout, color scheme used for each object type, the number of UI elements presented, the level of detail provided in each UI element, etc. For instance, in this example, each summary includes four lines of text, but each summary could include any number of lines of text depending on the implementation. In other embodiments, instead of a summary of the record, each UI element could potentially include actual records although in most cases each record would take up significant screen space.

Depending on the implementation, the relevant records can be identified using standard matching, and/or advanced matching techniques. The user can configure the insights application to use standard or advanced matching techniques for each object/record type.

The standard matching techniques can identify which records are relevant by finding records that reference and are directly associated with contact profile for the calling party. In one embodiment, the contact profile can include a contact identifier and/or organization identifier of (1) the party being called and/or (2) of the party a call is being received from. After identifying the relevant records that correspond to the contact profile, the standard matching techniques can then rank all of the potentially relevant records in order of importance in order of priority. In one embodiment, the contact identifier can be determined by using the contact name and associating it with a contact identifier that is used within the platform to identify a user, and/or organization identifier that is associated with that user within the platform. For instance, in one example, the application can search entities, such as fields of records, feeds of records, or followers of a record, or social media/document mentions for the callee/caller, or news feeds, for a matching the contact identifier (and/or organization identifier) to find records that are potentially relevant.

As one non-limiting example, records can be associated with a contact identifier or organization identifier for a specific caller, and records (e.g., lead name for a lead record, contact to an account record, or contact for the case record, etc.) associated with one or more of those identifiers can be found and then ranked according to their relevance in priority order from highest to lowest (e.g., most important to least important). For instance, when a caller makes a call, any organizations that the caller belongs to can be identified, and any records that the caller has access privileges to within that organization that relate to the party being called can be identified, ranked according to relevance, and UI elements for at least some of those relevant records can then be displayed in the insights page.

Likewise, the party being called may also belong to a separate organization, and any records within that organization that reference the caller or the party being called can be identified as being relevant, ranked according to relevance, and UI elements for at least some of those relevant records can then be displayed in the insights page.

By contrast, advanced matching techniques can identify which records are relevant using the standard matching techniques (described above), and also by finding records that indirectly reference and/or that are indirectly associated with a contact identifier or organization identifier of (1) the party being called and/or (2) of the party a call is being received from. AI technologies can find records that are determined to be of potential relevance and that are associated with second, third . . . , n-th level connections of the parties of the call, and then rank all of the potentially relevant records in order of importance or priority. The priority or ordering of those records can be determined using artificial intelligence technologies that identify records or other information that are relevant to a particular call or caller so that the user who is receiving the call has information available that can assist the user during his/her conversation with the particular caller. In one embodiment, the relevant records can be ranked using intelligent scoring algorithms that assign a relevance score to each relevant record, and then rank them from most relevant match to the least relevant match.

In one embodiment, an intelligent ranking module at the server system can apply one or more ranking algorithms to rank, based on input parameters such as object types or organizations, the relevant records according to an order of priority (or priority order) that indicates relative importance to the user. The ranking module can then dynamically rank all of the relevant records according to relative priority. For example, in one implementation, the ranking module outputs a matrix that includes the relevant records ordered according to relative priority. This way records that are likely to be most relevant to the user, based on the current profile for that user will readily be available to the user.

In one embodiment, the algorithm used by the ranking module is configurable based on preferences of the end user. For example, in one implementation, a weighting value can be assigned to each input parameter to indicate a relative importance of each input parameter, and the user can set/adjust weighting values to scale the relative importance of each input parameter. Examples of input parameters having adjustable weighting values can include things such as contact information for a particular caller/callee (e.g., name, contact's phone number, email, social media handle, etc.), CRM data, CRM related data, CRM feeds; feeds in which a particular caller/callee is mentioned or tagged in; object types; organizations, social media sources, etc. This allows the user to tune the ranking algorithm(s) to suit their individual preferences. Thus, for example, a user could set/adjust weighting values for each object type, to change relative importance of various types of relevant records so that each can be assigned its own importance. This way, if the user cares more about seeing records related to opportunity type objects as opposed to records related to lead type objects, the user can adjust the ranking algorithm so that records related to opportunity type objects will be of greater importance. By default, if the user does not change weighting values, the ranking module will use default weighting values to rank the relevant records.

The artificial intelligence technologies can provide, for example, predictive scoring, forecasting, and recommendations to narrow down the possible records, and prioritize the order for the records. The predictive capabilities of AI can be used, for example, to predict the which records are likely to be useful, and make smart recommendations based on the parties to the call. Various types of artificial intelligence modules or engines can be used to generate insights. This can be done, for example, by looking up records that are associated with a person who the call is being received from, or records that are associated with a person who is being called, and then using those records to determine which records or which other related records are relevant for this call. For example, in one implementation, records that are relevant can be identified by looking up the associated records for the caller or calling person, and artificial intelligence modules for predictive scoring, forecasting and recommendations can be used to narrow down the relevant records, and prioritize the order that those relevant records are displayed within the dynamic insights page.

In one implementation, Salesforce Einstein or similar AI technologies can be used to deliver advanced AI capabilities into sales, service, marketing and more, to provide a personalized and predictive customer experience for the user. Salesforce Einstein embeds advanced AI capabilities in the Salesforce Platform—in fields, objects, workflows, components and more. Salesforce Einstein leverages all the customer data in Salesforce including activity data from Salesforce Chatter, email, calendar and e-commerce; social data streams such as tweets and images; and even IoT signals—to train predictive models for sales, service, marketing, commerce and more. Powered by advanced machine learning, deep learning, predictive analytics, natural language processing and smart data discovery, Salesforce Einstein can allow models to be automatically customized for the user. These models learn, self-tune and get smarter with every interaction and additional piece of data. Salesforce Einstein can automatically discover and/or predict relevant records or insights that are related to the call.

AI technologies can be leveraged to process CRM data and identify records that provide highest order of match for the callee/caller user, and provide a ranked list of the matched records that are included in the dynamic insights page for: discovery, prediction, lead scoring, feed search, opportunity, account, feed and journey insights, activity capture, automated contacts, recommendations, engagement scoring, image classification, etc. The discovery module can perform analysis to find insights in millions of data combinations by automatically examining all variable combinations. Prediction modules can be standard or custom AI models that analyze any Salesforce field or object type to predict and rank relevant records for that field or object type. The lead scoring module automatically prioritizes the leads most likely to convert based on history and past deals. The feed search module can provide top-ranked answers to searches based on relevance and engagement signals such as most recent, likes, views, and answers; the search algorithm uses the Einstein Learn to Rank technique to get better over time so users always get the best results. The opportunity insights module can let a user know whether or not a deal is likely to close (e.g., can identify customer sentiment, competitor involvement, and overall prospect engagement). The account insights module can provide insights regarding key business developments pertinent to accounts (e.g., customers' latest news, M&A activity, company expansion updates, etc.). The feed insights module keeps members engaged by identifying and promoting popular content to ensure that important posts and hot-button conversations are seen, thanks to an intelligent activity feed. The journey insights module can leverage AI to analyze billions of touchpoints across consumer journeys and discover the optimal paths to conversion, including insights about which channels, messages, and events perform best. The activity capture module connects email and calendar to Salesforce to keep records up to date without any tedious data entry. The automated contacts module analyzes emails and calendar events, identifies new contacts and any contact role relationships, and surfaces suggestions for automatically adding new records to CRM. The recommendations module can be used to provide recommendations that recommend the next best product, content, or offer faster for every customer on any channel. The engagement scoring module can discover insights about why consumers click or purchase, and drive smarter marketing using predicted behavior. The image classification module can recognize logos, objects, food, and scenes in social images to discover new insights regarding a brand—like where certain products are being used—even if a name or keywords aren't mentioned.

In the embodiment illustrated in FIG. 3A, the dynamic insights page 310 includes user interface elements 312, 314, 316 that are each linked to a record associated with the caller. However, in other embodiments, the dynamic insights page 310 can include other user interface elements that are each linked to a record associated with the caller, other user interface elements that are each linked to a record associated with the callee, or other user interface elements that are each linked to a record associated with another person or entity and determined to be relevant to the call, as shown in FIG. 3C, which is another example of a graphical user interface displayed at the mobile communication device during the voice-over-IP call to display a dynamic insights page in accordance with the disclosed embodiments. FIG. 3C is similar to FIG. 3A except that the opportunity type record associated with the user interface element 324 is associated with an owner named Doug Swift who is not part of the call that is taking place.

In this non-limiting embodiment, the user interface elements 312, 314, 316 are each linked to a record associated with a particular caller who is making the voice-over-IP call to a user (or "callee"). In this example, the dynamic insights page 310 displays user interface elements 312, 314, 316 that are linked to a number of records that are associated with the caller, Ben Walker, including a UI element 312 to a record for an account type object, a UI element 314 to a record for a case type object, and a UI element 316 to a record for an opportunity type object. In addition, although not shown due to page constraints, any number of other user interface elements (that are each linked to a record) could be included to other records. For example, the user can scroll through the page 310 to display the additional user interface elements that are not visible in FIG. 3A, but are each linked to other records. Each of the records can be associated with a particular organization. For instance, in this example, the user interface elements 312, 314 are each linked to a record associated with a first organization (ORG1), whereas the user interface element 316 is linked to a record associated with a second organization (ORG2). The graphical user interface can also include other types of action buttons, such as a switch call screen button 318 that can be selected by the user to switch back to the call screen that is illustrated in FIG. 2. In addition, the ellipsis button 320 can be selected to cause a pop-up sub-menu (not shown) appear that allows a user to take certain predefined actions with respect to a particular record that is selected such as: mark for later, book mark, edit the record, create a new record, etc. In addition, other action buttons can be included that allow the user to cause an insights summary page (not shown) that summarizes all of the relevant records according to.

Figure 5A:
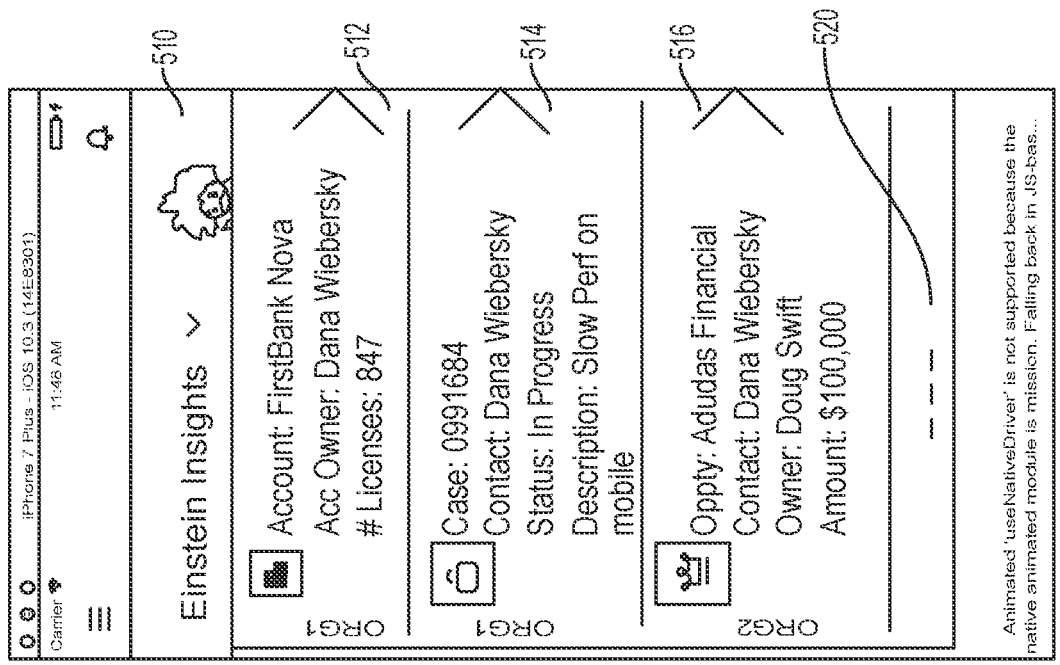
FIG. 5A is an example of another graphical user interface that can be displayed at the mobile communication device during the regular call to display a dynamic insights page in accordance with the disclosed embodiments.
Figure 4:
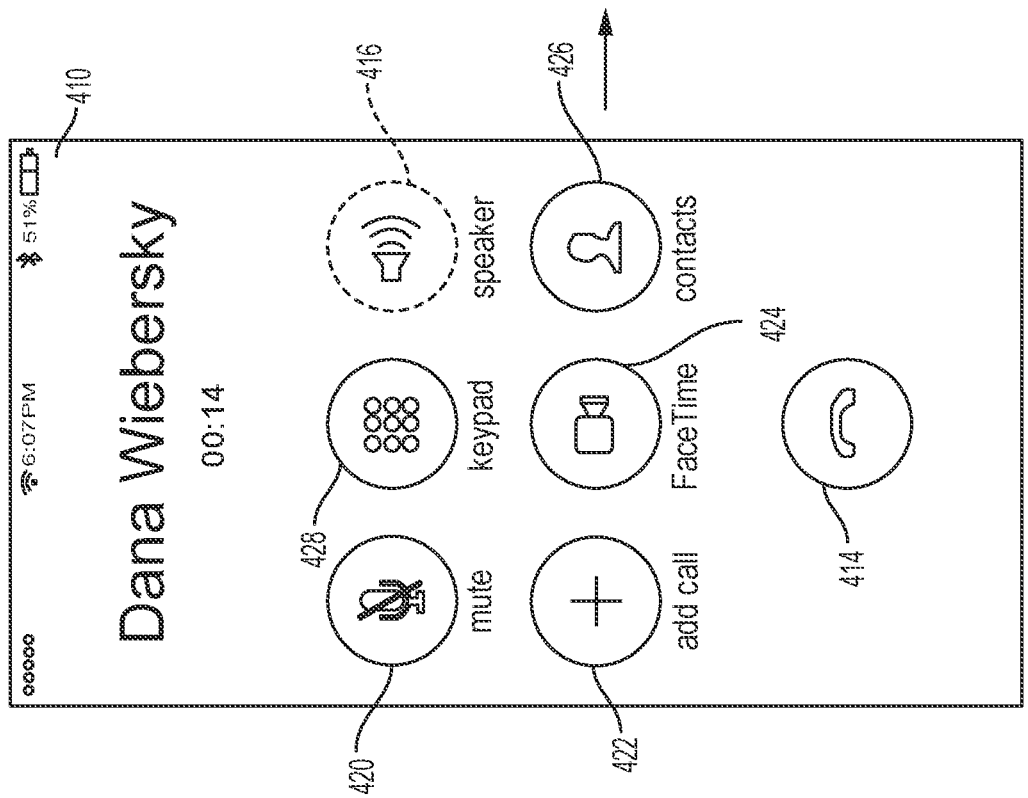
FIG. 4 is an example of a graphical user interface displayed at a mobile communication device when the user receives a regular call in accordance with the disclosed embodiments.
Figure 5B:
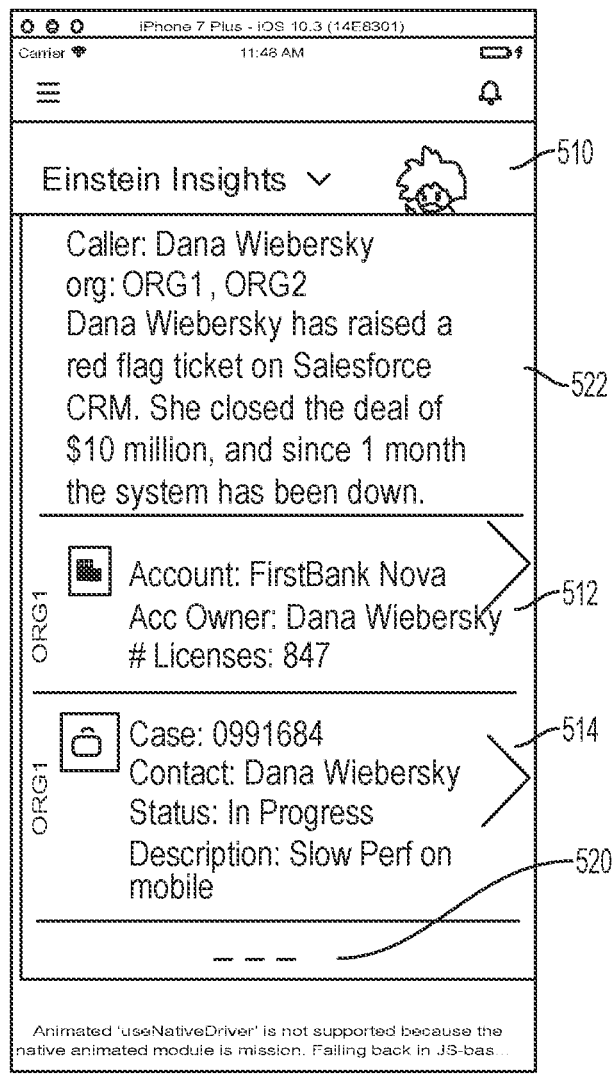
FIG. 5B is an example of another graphical user interface that can be displayed at the mobile communication device during the regular call to display a dynamic insights page having an intelligence summary report in accordance with the disclosed embodiments.

FIGS. 4, 5A and 5B show graphical user interfaces that can be displayed at a mobile communication device when a user receives a regular call (e.g., voice or video call over a cellular network) in accordance with the disclosed embodiments. As will be described in greater detail below, when the user receives a regular call at their mobile communication device 140, a dynamic insights page 510 can be displayed via a graphical user interface at the mobile communication device 140. This dynamic insights page 510 can include user interface elements 512, 514, 516 that are each linked to a record. Each of the records can be associated, for example, with the party that is calling the user, but are not limited to being associated with the calling party. For instance, the records can be associated with the party being called, or another entity or person who is not even part of the call. As in the example described with reference to FIG. 3A, the records, that are linked to the user interface elements displayed via the dynamic insights page 510, can be determined using artificial intelligence technologies that identify records or other information that are relevant, for example, to a particular caller so that the user has information that can assist the user during his/her conversation with the particular caller.

In particular, FIG. 4 is a graphical user interface displayed at a mobile communication device 140 when the user receives a regular call in accordance with the disclosed embodiments. In this particular example, the graphical user interface is one that is commonly displayed on an iPhone®; however, it should be appreciated that the GUI could be one that is displayed for any type of smartphone. In this example, a user has received a regular call to a calle, in particular, a contact named Dana Wiebersky. The graphical user interface can include various user-interface elements including, but not limited to, an end call button 414 that can be selected to end the call, a speaker button 416 that can be selected to place the call on speaker, a mute button 420 that can be used to mute the call, an add call button 422 that can be selected to add another user to the call, a FaceTime button 424 that can be selected to switch the regular call from a voice call to a video call, a contacts button 426 that can be selected to display a contacts page, and a keypad button 428 that can be selected to display a numeric keypad for use by the user.

FIG. 5A shows an example of another graphical user interface that can be displayed at the mobile communication device 140 during a regular call to display a dynamic insights page 510 in accordance with the disclosed embodiments. In this embodiment, when an incoming call notification is received at the mobile communication device 140, the user can launch the Salesforce® mobile CRM application which will display the dynamic insights page 510 via a graphical user interface as shown in FIG. 5A. In this non-limiting example, the dynamic insights page 510 is automatically populated with user interface elements 512, 514, 516 that are linked to records that are determined to be relevant given the particular caller. These records can include records associated with the particular caller, or others.

The user interface elements 512, 514, 516 that are displayed via the graphical user interface can include any of the features as described above with respect to FIG. 3A. In this non-limiting example, the user interface elements 512, 514, 516 are linked to records associated with a particular caller who is calling the user's mobile communication device. In this particular example, the dynamic insights page 510 displays user interface elements 512, 514, 516 that are each linked to a record associated with the caller, Dana Wiebersky, including a UI element 512 to a record for an account type object, a UI element 514 to a record for a case type object, and a UI element 516 to a record for an opportunity type object. In addition, although not shown in FIG. 5A, any number of other user interface elements that are each linked to a record could also be included to other records. The user can scroll through the page to display the additional user interface elements that are each linked to a record. Each record that is linked to one of the user interface elements can be associated with a particular organization. In this example, the user interface elements 512, 514 are each linked to a record associated with a first organization (ORG1), whereas the user interface element 516 is associated with a second organization (ORG2). The graphical user interface can also include other types of action buttons as described above with respect to FIG. 3A, such as the ellipsis button 520 can be selected to cause a pop-up sub-menu (not shown) appear that allows a user to take certain predefined actions with respect to a particular record that is selected such as: mark for later, book mark, edit the record, create a new record, etc.

FIG. 5B is an example of another graphical user interface that can be displayed at the mobile communication device during the regular call to display a dynamic insights page 510 having an intelligence summary report 522 in accordance with the disclosed embodiments. FIG. 5B is similar to FIG. 5A except that it includes an intelligence summary report 522. The intelligence summary report 522 shown in FIG. 5B provides the contact name for the caller, the organizations that are associated with that caller, and a summary of key details about the caller, but the intelligence summary report 522 shown in FIG. 5B is one non-limiting example of information that can be included in an intelligence summary report and could include any other information as described above with respect to FIG. 3B.

Figure 6:
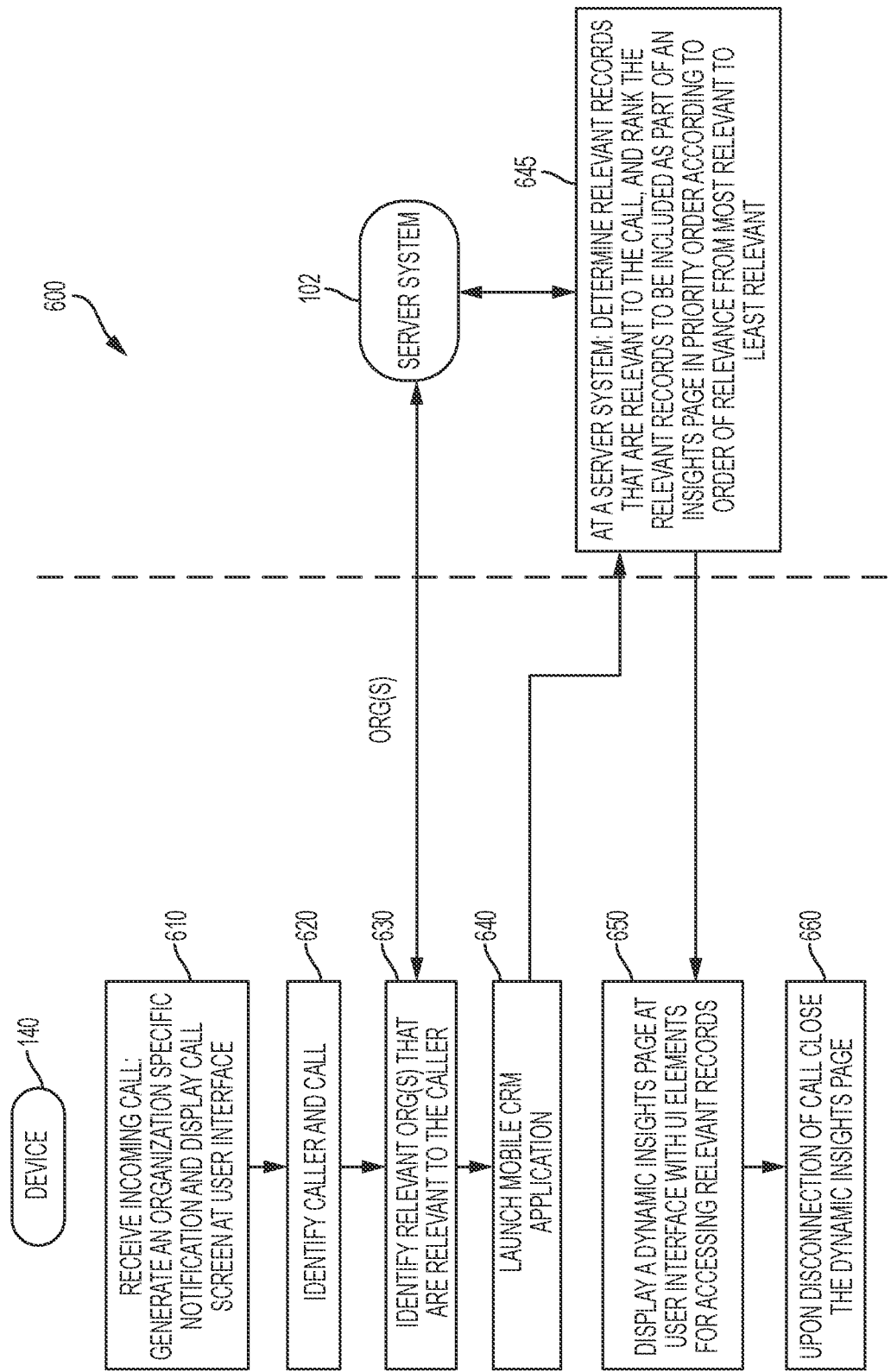
FIG. 6 is a flow chart that illustrates a method in accordance with the disclosed embodiments.
Figure 7:
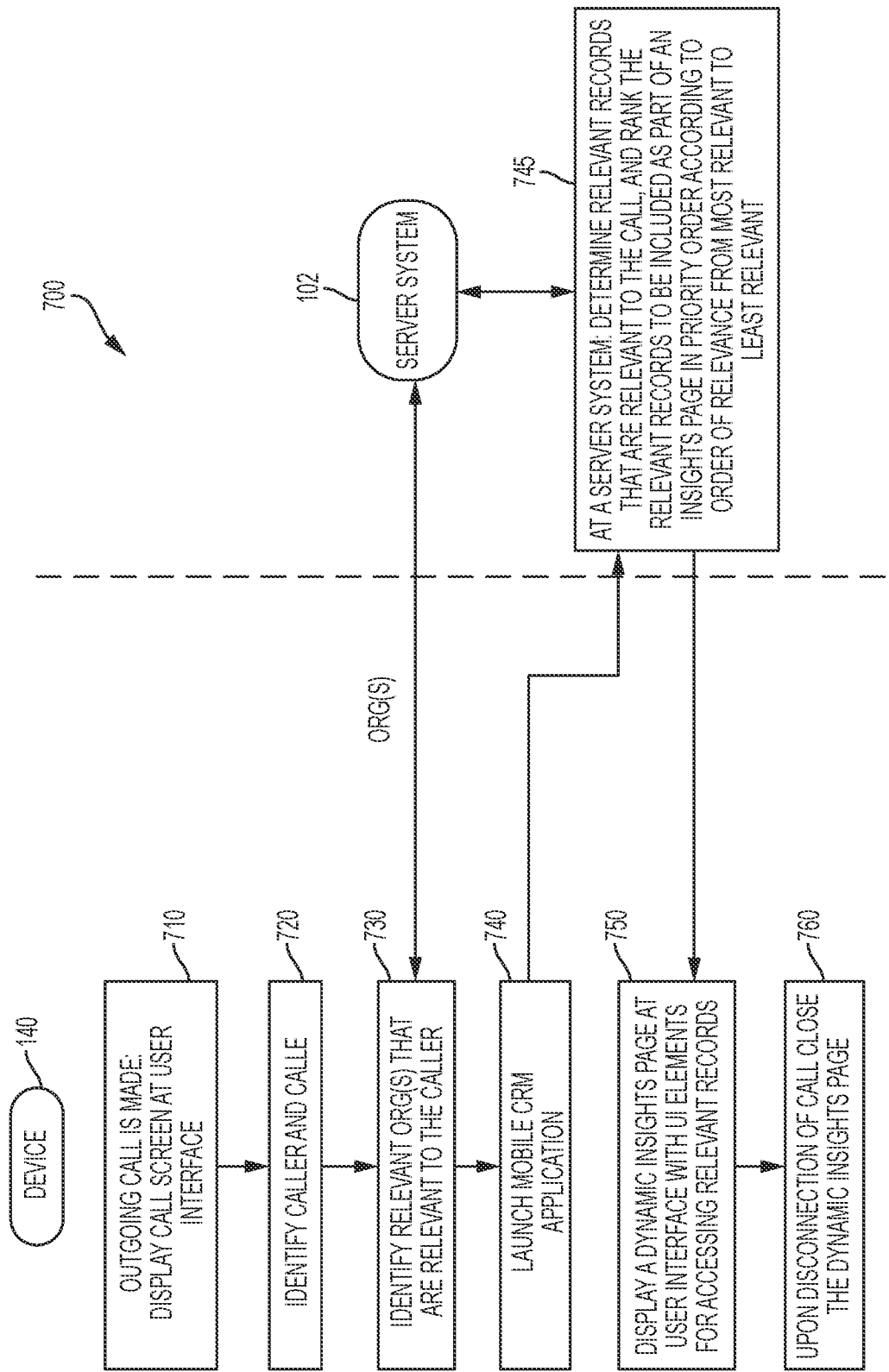
FIG. 7 is a flow chart that illustrates another method in accordance with the disclosed embodiments.

FIGS. 6 and 7 are flowcharts that illustrate methods performed in accordance with the disclosed embodiments. FIGS. 6 and 7 will be described with continued reference to FIGS. 1-5B. With respect to FIGS. 6 and 7, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIGS. 1-5B. In certain embodiments, some or all steps of these methods, and/or substantially equivalent steps, are performed by execution of processor-readable instructions stored or included on a processor-readable medium. For instance, in the description of FIGS. 6 and 7 that follows, the mobile communication device 140 and server system 102 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together.

FIG. 6 is a flow chart that illustrates a method 600 in accordance with the disclosed embodiments.

At 610, in response to receiving an incoming call, the mobile communication device 140 generates an organization specific notification and displays a call screen via a GUI of the mobile communication device 140. In various embodiments, the incoming call can be a regular cellular (e.g., voice or video) call, a WiFi call, or a voice-over-IP call.

At 620, an insights application identifies the caller who is making the call and the callee/user of the mobile communication device 140 that is receiving the call. Depending on the implementation, the insights application can be implemented at the mobile communication device 140 and/or the server system 102. The identification can be performed, for example, by determining identifying information associated with each party (e.g., by a contact name, phone number or contact identifier associated with the caller and callee that can be used to identify the caller and callee). For example, a phone number, a contact name or other contact information associated with the caller (i.e., the party a call is being received from) can be used to identify the caller, and this information can then be used to determine a contact identifier for the caller that is specific to the platform, and/or an organization identifier for the caller that is specific to the platform. Likewise, a phone number, a contact name or other contact information associated with the callee (i.e., the party being called) can be used to identify the callee, and this information can then be used to determine a contact identifier for the callee that is specific to the platform, and/or an organization identifier for the callee that is specific to the platform.

In one non-limiting embodiment, at 630, the insights application (e.g., at the server system 102 or at the mobile communication device 140 that communicates with the server system 102) can identify one or more relevant organizations (e.g., any organization including those associated with and relevant to the caller and/or the callee).

At 640, the mobile CRM application can be launched at the mobile communication device 140, and relevant records to be included as part of the dynamic insights page are determined at the server system 102. How the application is launched varies depending on the implementation. For example, in one embodiment, the mobile CRM application automatically launches after identifying the caller and/or callee. In another embodiment, the application can be launched by the user by selecting an action button, icon or other user interface element that causes the mobile CRM application to be launched. At 645, the server system can determine relevant records that are relevant to the call, and rank the relevant records that are to be included as part of an insights page in priority order according to order of relevance from most relevant to least relevant. This information can then be used to order user interface elements that will be part of the insights page, and/or to determine and generate information that will be included as part of an intelligence summary report. In one embodiment, an intelligent ranking module (e.g., at the server system or at the computing device) can apply one or more ranking algorithms that can generate a score for each relevant record, and then rank the relevant records, based on the scores for each relevant record, according to an order of priority (or priority order) that indicates relative importance to the user. For example, in one implementation, the ranking module can dynamically rank all of the relevant records according to relative priority and output a matrix that includes the relevant records ordered according to relative priority. This way records that are likely to be most relevant to the user, based on the current profile for that user will readily be available to the user.

As noted above, in one embodiment, the algorithm used by the ranking module is configurable based on preferences of the end user. For example, in one implementation, a weighting value can be assigned to each input parameter to indicate a relative importance of each input parameter, and the user can set/adjust weighting values to scale the relative importance of each input parameter. Examples of input parameters having adjustable weighting values can include things such as contact information for a particular caller/callee (e.g., name, contact's phone number, email, social media handle, etc.), CRM data, CRM related record data, CRM Feeds; feeds in which a particular caller/callee is mentioned or tagged in; object types; organizations, social media sources, etc. This allows the user to tune the ranking algorithm(s) to suit their individual preferences. By default, if the user does not change weighting values, the ranking module will use default weighting values to rank the relevant records At 650, the dynamic insights page is displayed at a user interface of the mobile communication device 140. The dynamic insights page includes user interface elements for accessing records as described above. In one non-limiting embodiment, the records can include, but are not limited to, records that are related or relevant to the caller that was identified at 620 from the organizations that were identified at 630 (e.g., records that are relevant to an organization associated with the caller).

At 660, when the call ends or is disconnected, the dynamic insights page is closed at the mobile communication device 140. The system maintains a history log of records that are included in the dynamic insights page so that if a record is deleted it can be tracked from the history log. The mobile CRM application can also be closed or left open depending on the implementation or user preferences.

The examples above that are described with reference to FIGS. 2-6, describe scenarios for launching a mobile CRM application and displaying a dynamic insights page of that mobile CRM application in response to incoming calls received from callers. However, it should be appreciated that the analogous concepts can be applied when a user makes an outgoing call using their mobile communication device 140 to launch a mobile CRM application and populate a dynamic insights page with UI elements that can include records or other information related to the party being called, as will now be described with reference to FIG. 7. In one non-limiting embodiment, the dynamic insights page can include, for example, user interface elements that are each linked to a record associated with the party being called (or "callee").

FIG. 7 is a flow chart that illustrates another method 700 in accordance with the disclosed embodiments.

The method 700 begins at 710, when an outgoing call is made from the mobile communication device 140 and a call screen is displayed via a GUI of the mobile communication device 140. The outgoing call can be a regular cellular (e.g., voice or video) call, a WiFi call, or a voice-over-IP call. At 720, an application identifies the caller/user who is making the call from the mobile communication device 140 and the callee that is receiving the call. The application can be implemented at the mobile communication device 140 and/or the server system 102. The identification can be performed, for example, as described above with reference to step 620 of FIG. 6.

At 730, the insights application (e.g., at the server system 102 or at the mobile communication device 140 that communicates with the server system 102) can identify one or more relevant organizations (e.g., any organization including those associated with and relevant to the caller and/or the callee).

At 740, the mobile CRM application can be launched at the mobile communication device 140, as described above with reference to step 640 of FIG. 6. At 750, a dynamic insights page is displayed at the user interface of the mobile communication device 140. The dynamic insights page includes user interface elements for accessing records, as described above. In one non-limiting embodiment, the records can include, but are not limited to, records that are related or relevant to the callee that was identified at 720 from the organizations that were identified at 730. At 745, the server system can determine relevant records that are relevant to the call, and rank the relevant records that are to be included as part of an insights page in priority order according to order of relevance from most relevant to least relevant. This information can then be used to order user interface elements that will be part of the insights page, and/or to determine and generate information that will be included as part of an intelligence summary report. The ranking can be performed by a ranking module as described above with respect to 645 of FIG. 6.

When the call ends or is disconnected, at 760, the dynamic insights page is closed at the mobile communication device 140. The server system 102 can also maintains a history log of records that are included in the dynamic insights page so that if a record is deleted it can be tracked from the history log. The mobile CRM application can also be closed or left open depending on the implementation or user preferences.

The following description is of one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above.

Figure 8:
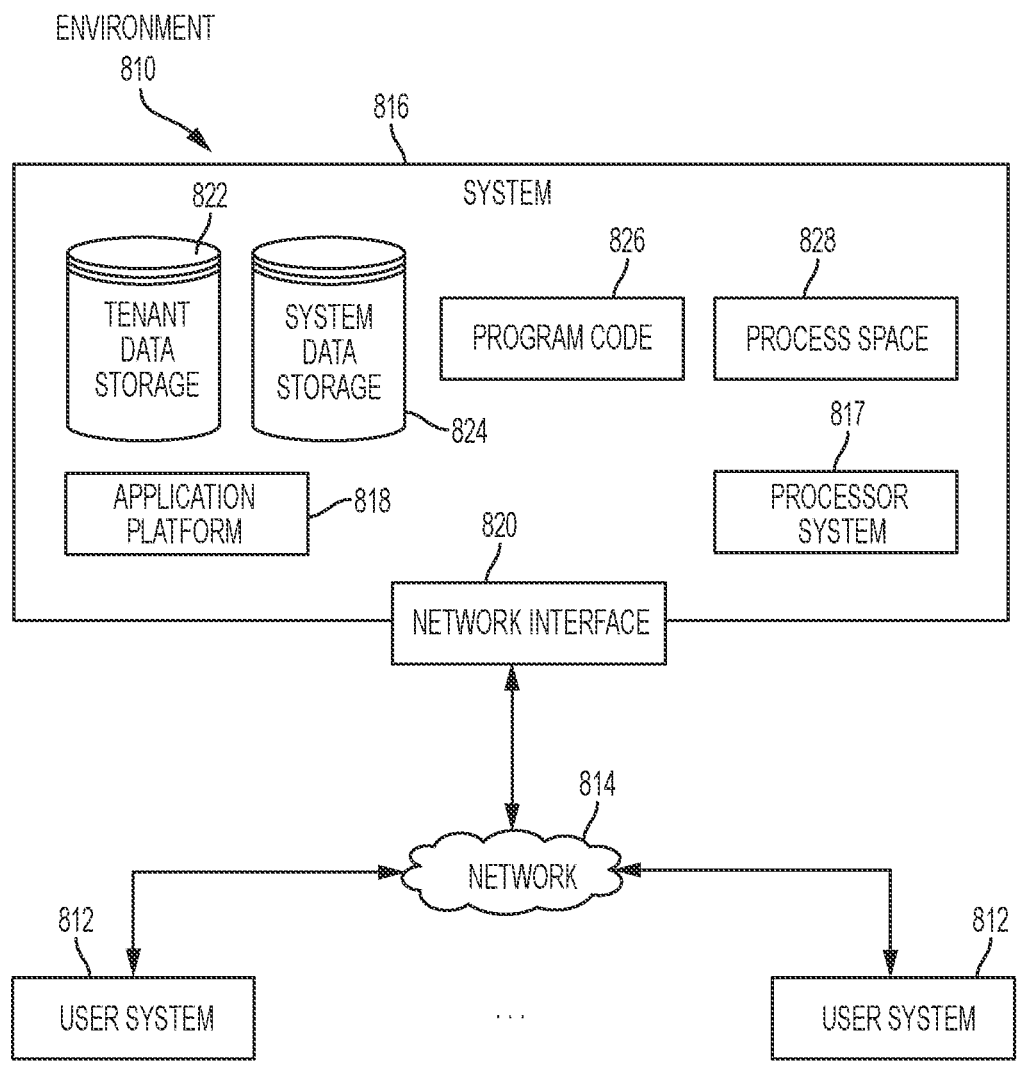
FIG. 8 is a block diagram that illustrates an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data, system database 824 for storing system data, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
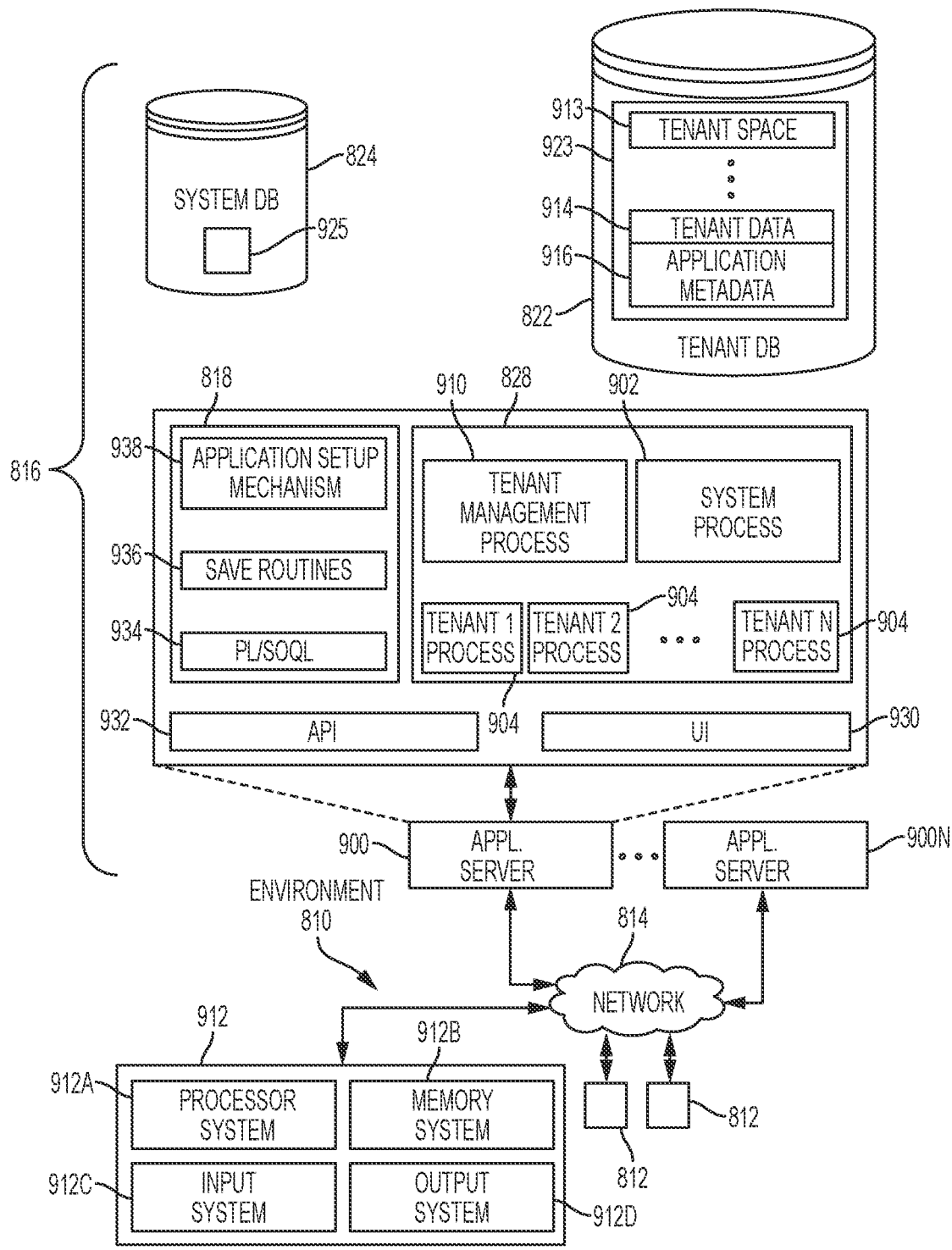
FIG. 9 is a block diagram that illustrates example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server 900$_1$ can be coupled via the network 814 (for example, the Internet), another application server 900$_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
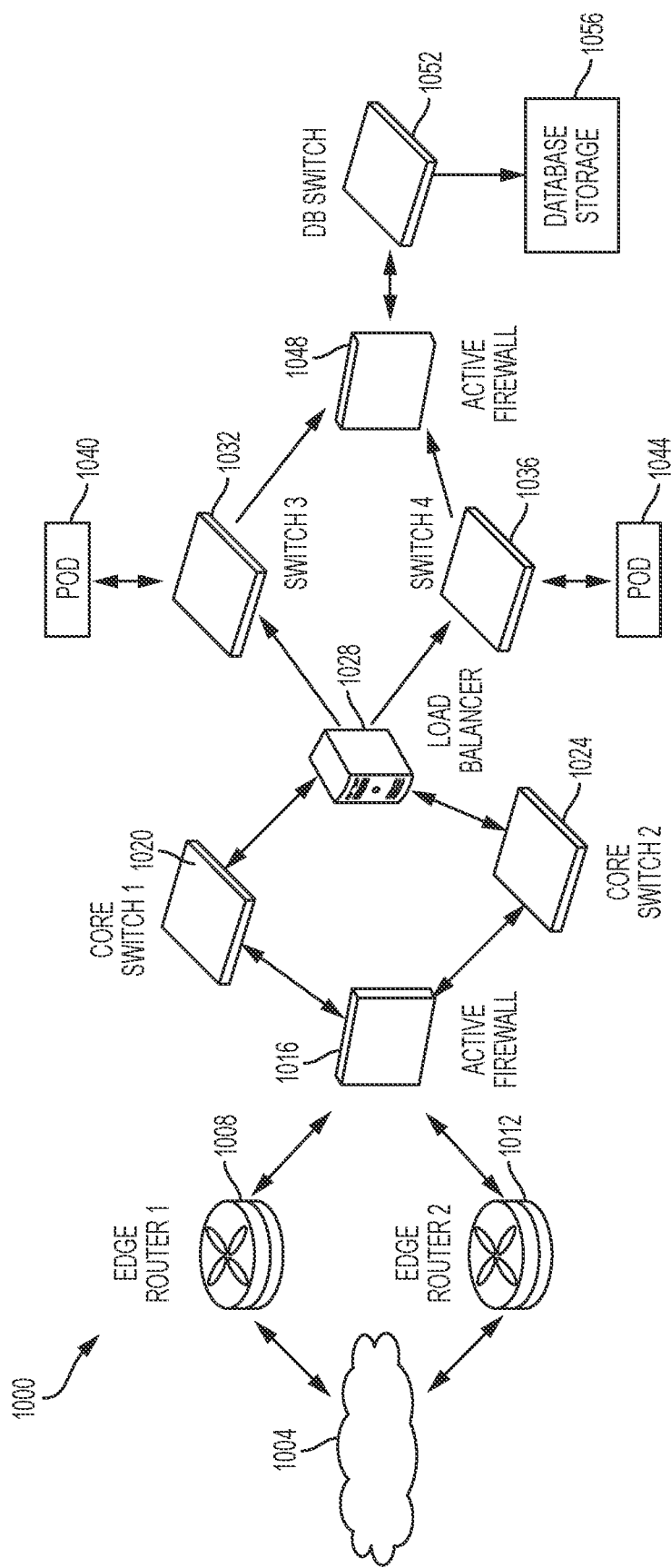
FIG. 10A is a block diagram that illustrates example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
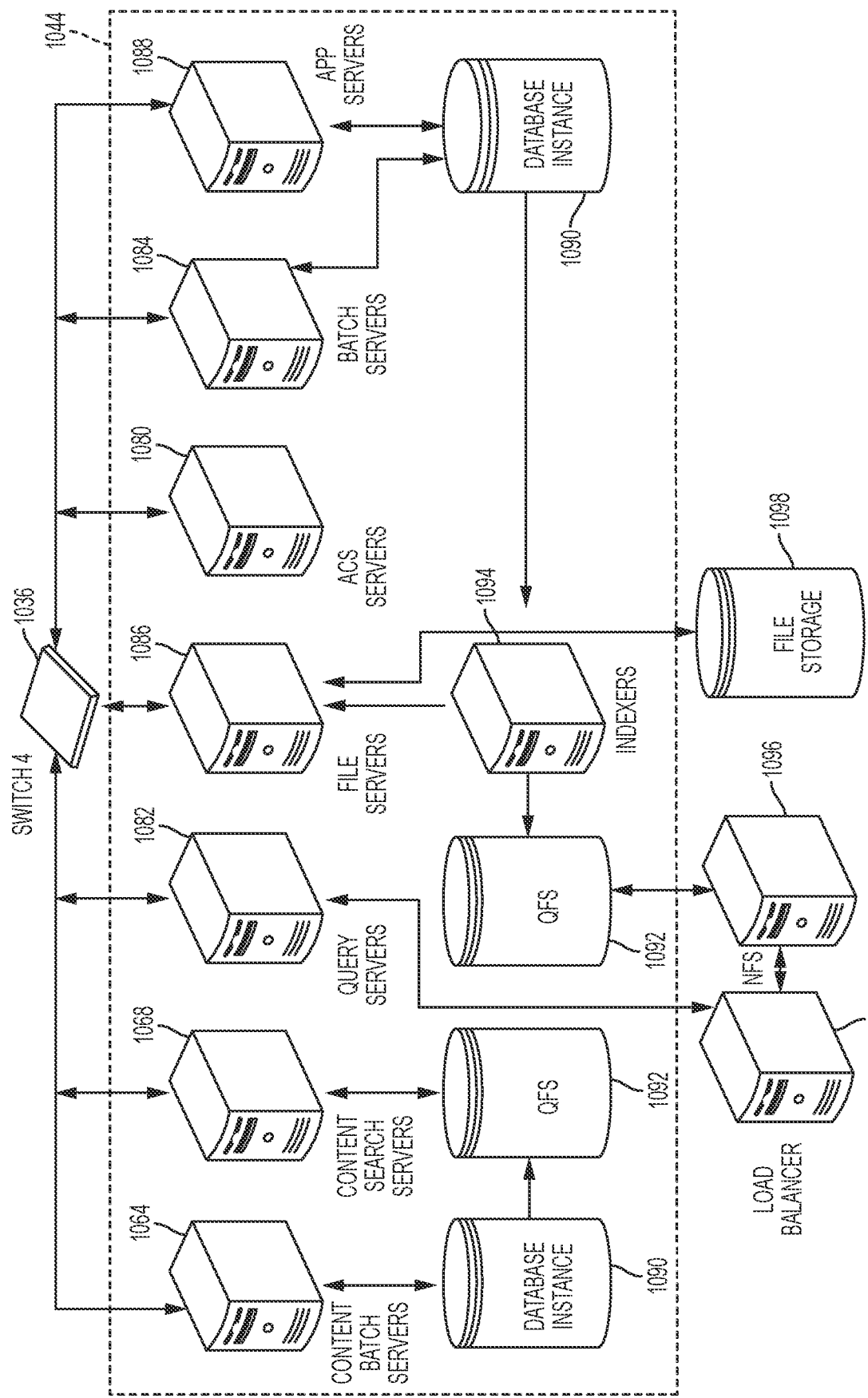
FIG. 10B is a block diagram that further illustrates example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, California. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
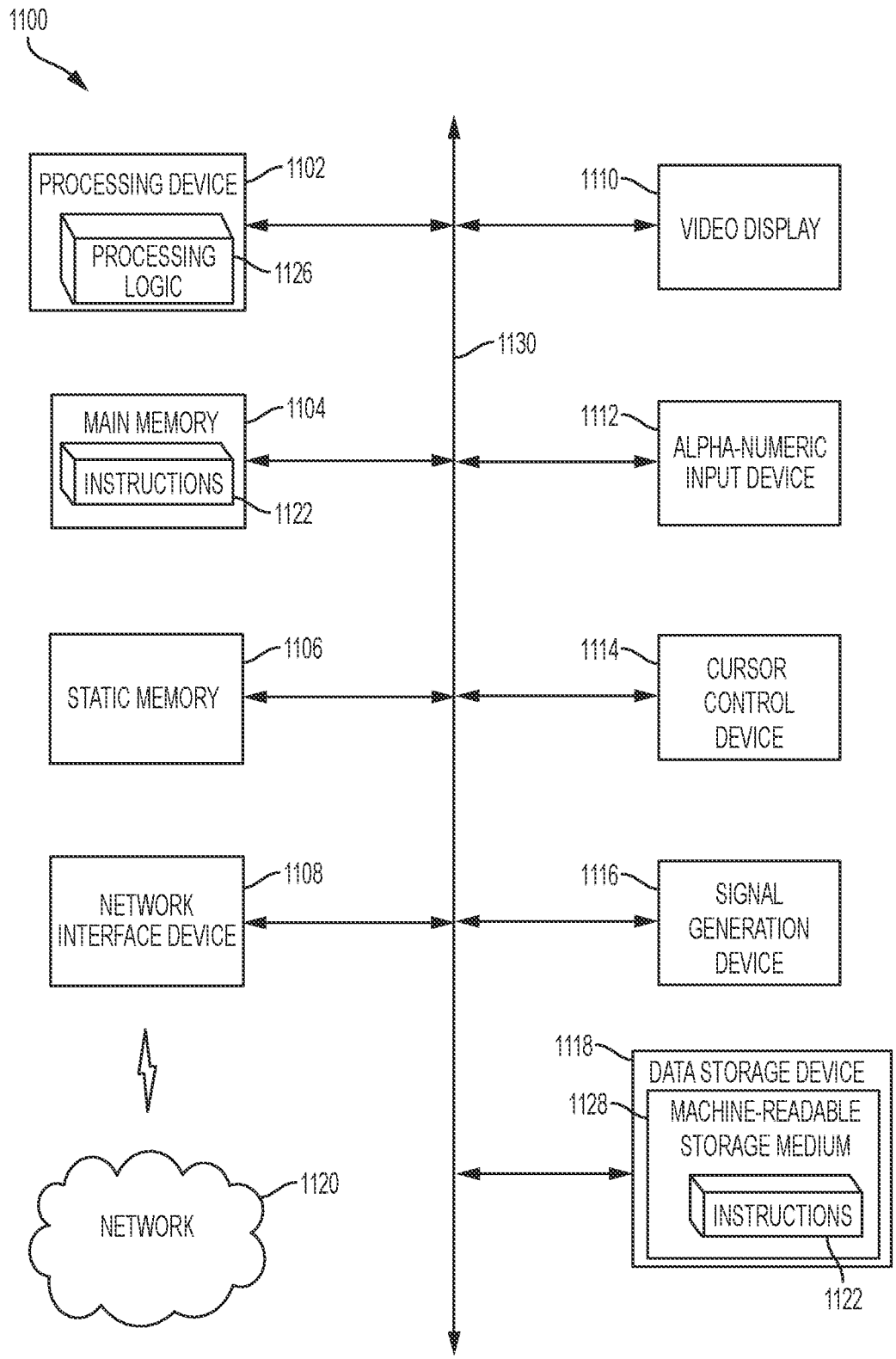
FIG. 11 is a block diagram that illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may represent a server system 102 as shown in FIG. 1.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 12:
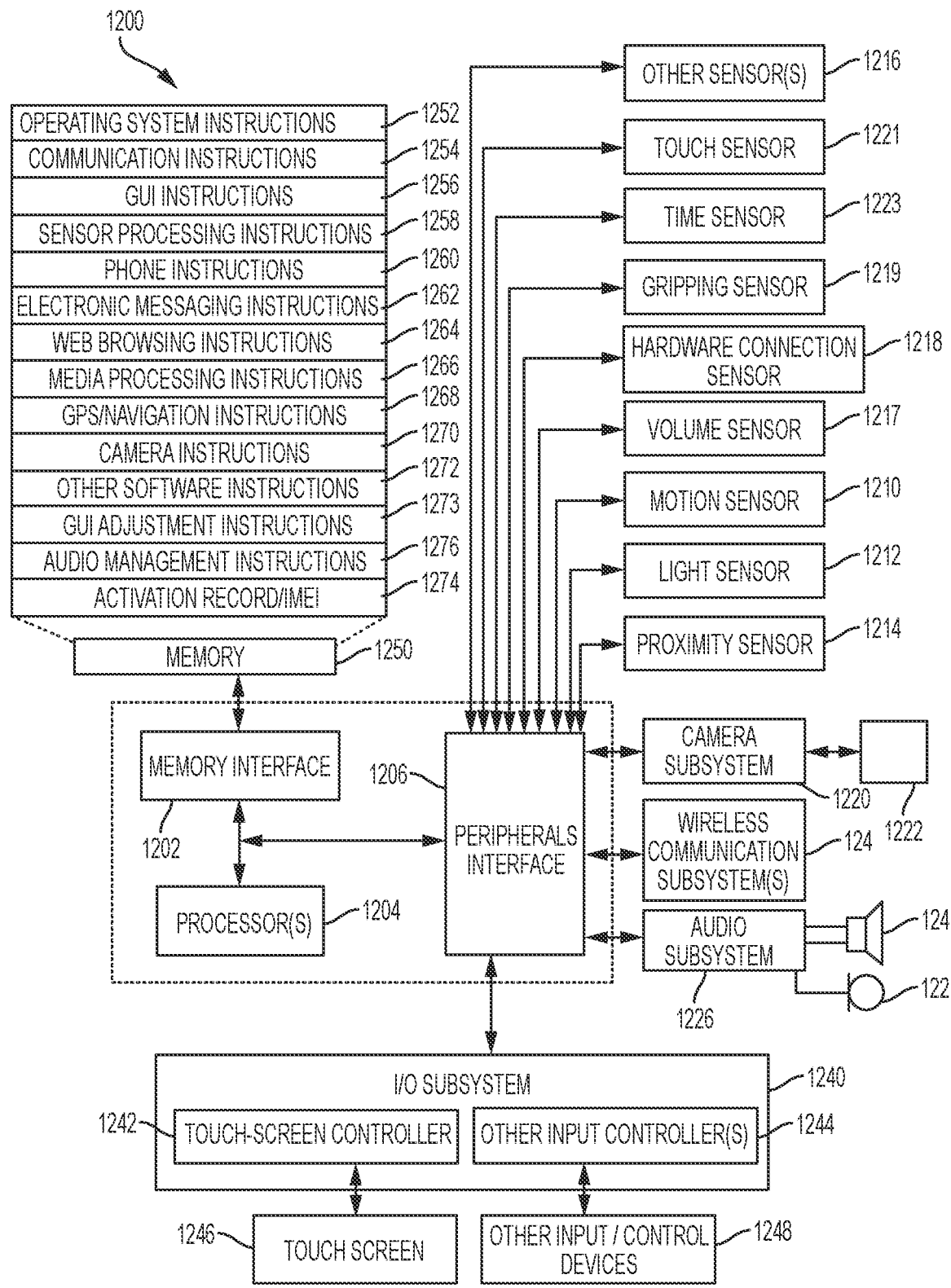
FIG. 12 is a block diagram of an example implementation of a mobile communication device in accordance with the disclosed embodiments.

FIG. 12 is a block diagram of an example implementation 1200 of the mobile communication device 140 of FIG. 1. The mobile communication device 140 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the mobile communication device 140 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the orientation, lighting, and proximity functions. A hardware connection sensor 1218 can be coupled to the peripherals interface 1206, to facilitate determining a state of connecting the mobile communication device 140 to any hardware, e.g., a docking station, a charger, a personal computer, etc. A gripping sensor 1219 can be coupled to the peripherals interface 1206, to determine if the mobile communication device 140 is being gripped. In various implementation, a gripping sensor can include a temperature sensor, and/or a pressure sensor. Further, a touch sensor 1221 can be coupled to the peripherals interface 1206, to detect if a user is touching user input interface, e.g., a touch screen or a keypad. A time sensor 1223 can also be coupled to the peripherals interface 1206, to detect a duration of a certain state of the mobile communication device 140. Other sensors 1216 can also be connected to the peripherals interface 1206, such as a positioning system (e.g., GPS receiver), a temperature sensor, a biometric sensor, a gyroscope, or other sensing device, to facilitate related functionalities.

A camera subsystem 1220 and an optical sensor 1222, e.g., a charged coupled device CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network(s) over which the mobile communication device 140 is intended to operate. In particular, the wireless communication subsystems 1224 may include hosting protocols such that the device 140 may be configured as a base station for other wireless devices.

An audio subsystem 1226 can be coupled to a loudspeaker 124, and microphone 122 to facilitate voice-enabled functions, for example, hands-free functionalities, voice recognition, voice replication, digital recording, and telephony functions.

The I/O subsystem 1240 can include a touch screen controller 1242 and/or other input controller(s) 1244. The touch-screen controller 1242 can be coupled to a touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

The other input controller(s) 1244 can be coupled to other input; control devices 1248, such as one or more buttons, rocker switches, thumb-wheel, infrared port, USB port; and/or a pointer device such as a stylus. The one or more buttons (not shown) can include an up/down button for volume control of the speaker 126 and loudspeaker 124 and/or the microphone 122.

In some implementations, the mobile communication device 140 can present recorded audio and/or video files, such as MP3, AAC, and MPEG files. In some implementations, the mobile communication device 140 can include the functionality of an MP3 player, such as an iPod™. The mobile communication device 140 may, therefore, include a 126-pin connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks. In some implementations, the operating system 1252 can be a kernel (e.g., UNIX kernel).

The memory 1250 may also store communication instructions 1254 to facilitate communicating with one or more additional devices, one or more computers and/or one or more servers. The memory 1250 may include graphical user interface instructions 1256 to facilitate graphic user interface processing; sensor processing instructions 1258 to facilitate sensor-related processing and functions; phone instructions 1260 to facilitate phone-related processes and functions;

electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/navigation instructions 1268 to facilitate GPS and navigation-related processes and instructions; camera instructions 1270 to facilitate camera-related processes and functions; GUI adjustment instructions 1273 to facilitate adjustment of graphical user interfaces and user interface elements in response to sensor data; and/or other software instructions 1272 to facilitate other processes and functions.

In addition, the memory 1250 can store audio management instructions 1276 to facilitate functions managing audio subsystem, including the loudspeaker 124, and the microphone 122. In some implementations, the audio management instructions 1276 are operable to toggle the speakerphone system and adjust speaker volume and/or microphone sensitivity, in response to the sensor processing instructions 1258.

The memory 1250 may also store other software instructions (not shown), such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. An activation record and International Mobile Equipment Identity (IMEI) 1274 or similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the mobile communication device 140 may be implemented in hardware and/or in software, including in one or more signal processing and/or application specific integrated circuits.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method comprising, at a server system:
   receiving data identifying a party of a call;
   in response to a customer relationship management (CRM) application being launched at a computing device and without any further user input:
      automatically determining records that are potentially relevant to the call and that are to potentially be included as part of an insights page of the CRM application, wherein at least some of the records are automatically determined by analyzing CRM information maintained at a CRM system using artificial intelligence;
      ranking the records that are potentially relevant to the call in a priority order according to relevance from most relevant to least relevant; and
      causing display of the insights page at a user interface of the computing device without any further user input, wherein the insights page comprises: at least some of the records displayed in the priority order as relevant records, and at least one user interface element that is linked to and selectable to open one of the relevant records.

2. The method according to claim 1, wherein the using artificial intelligence, further comprises:
   using a predictive scoring model to narrow down and predict which records are potentially relevant to the call and that are to potentially be included as part of the insights page of the CRM application.

3. The method according to claim 1, wherein the records that are potentially relevant to the call comprise one or more of: social activity data from a social media application, email data from an email application, calendar data from a calendar application and e-commerce data.

4. The method according to claim 1, wherein analyzing CRM information maintained at the CRM system comprises:
   analyzing fields and object types of records maintained at the CRM system to predict the relevant records.

5. The method according to claim 1, wherein analyzing fields and object types of records maintained at the CRM system to predict the relevant records comprises:
   determining, from a lead object type, relevant lead records by automatically prioritizing leads that are most likely to convert based on historical information about past deals;
   determining, from an opportunity object type, relevant opportunity records for opportunities that are likely to close based on customer sentiment, competitor involvement, and overall prospect engagement;
   determining, from an account object type, relevant account records based on key business developments pertinent to accounts; and
   determining, from a contact object type, relevant contact records by analyzing emails and calendar events to identify contacts.

6. The method according to claim 1, wherein the ranking, further comprises:
   ranking, via a ranking algorithm based on input parameters, the records that are potentially relevant to the call in the priority order that indicates relative importance to an end user from most relevant to least relevant, wherein the input parameters comprise one or more object types.

7. The method according to claim 6, wherein the ranking algorithm and the input parameters are configurable based on preferences of the end user, and wherein the method further comprises:
   assigning a weighting value to each input parameter to indicate a relative importance of each input parameter and scale the relative importance of each input parameter.

8. The method according to claim 7, wherein the input parameters comprise different object types, and wherein respective weighting values are assigned for each of the different object types to change the relative importance of each of the different object types.

9. The method according to claim 1, wherein the using artificial intelligence, comprises:
   identifying first records that reference one or more identifiers in a contact profile associated with a caller without any further user input from any user including the caller or a callee, wherein the contact profile associated with the caller comprises one or more of: a contact identifier for the caller and a first organization identifier for the caller; and
   identifying second records that reference one or more identifiers in a second contact profile associated with the callee without any further user input from any user including the caller or the callee, wherein the contact profile associated with the callee comprises one or more of: a second contact identifier for the callee and a second organization identifier for the callee.

10. The method according to claim 9, wherein at least some of the first records and the second records are determined using a predictive artificial intelligence module to identify records that are of potential relevance to the call and associated with other connections of the caller or the callee that are not parties to the call, and
    wherein ranking the records in the priority order according to relevance from most relevant to least relevant, comprises:
    using intelligent scoring algorithms that assign a relevance score to each of the records that are of potential relevance to the call and associated with the other connections of the caller or the callee that are not parties to the call; and
    ranking each of the records that are of potential relevance based on their respective relevance scores in relative priority order according to relevance from most relevant to least relevant, wherein the most relevant provides a highest order of match for the callee or the caller, and wherein the least relevant provides a lowest order of match for the callee or the caller.

11. The method according to claim 1, wherein each user interface element comprises:
    a summary of a relevant record that is linked to and associated with, and
    wherein each user interface element functions as a hyperlink that, when selected, causes a new page to open and be displayed that includes the relevant record.

12. The method according to claim 11, wherein each user interface element comprises:
    an action button that is selectable to trigger other actions with respect to the relevant record that is associated with that user interface element.

13. The method according to claim 1, wherein the at least one user interface element is displayed in a list view ranked according to the priority order.

14. The method according to claim 1, further comprising:
  determining first identifying information associated with a caller who is making the call and second identifying information associated with a callee that is receiving the call without any further user input from any user including the caller or the callee, wherein the first identifying information comprises: a contact name or phone number;
  using the first identifying information to determine a first contact identifier for the caller that is specific to an application platform and one or more first organization identifiers for the caller that are specific to the application platform without any further user input from any user including the caller or the callee; and
  using the second identifying information to determine a second contact identifier for the callee that is specific to the application platform and one or more second organization identifiers for the callee that are specific to the application platform without any further user input from any user including the caller or the callee.

15. The method according to claim 1, wherein each of the relevant records comprise: records that are determined to be relevant to the call from any organization that a user has access privileges to that allow that user to access records without any further user input from any user including a caller or a callee.

16. The method according to claim 1, wherein the insights page further comprises: an intelligence summary report comprising one or more user interface elements that summarize intelligence information with respect to a caller making the call or a callee being called, schedule information with respect to the caller making the call or the callee being called, habits information with respect to the caller making the call or the callee being called, goal information with respect to the caller making the call or the callee being called, and social media reference information with respect to the caller making the call or the callee being called.

17. A system, comprising:
  a computing device comprising a user interface and being configured to: automatically launch a customer relationship management (CRM) application in response to a call and identify a party making the call; and
  a server system comprising at least one hardware-based processor and memory, wherein the memory comprises processor-executable instructions encoded on a non-transient processor-readable media, wherein the processor-executable instructions, when executed by the at least one hardware-based processor, are configurable to:
  automatically determine, in response to automatically launching the CRM application at the computing device and without any further user input, records that are potentially relevant to the call and that are to potentially be included as part of an insights page of the CRM application, wherein at least some of the records are automatically determined by analyzing CRM information maintained at a CRM system using artificial intelligence;
  rank the records that are potentially relevant in a priority order from most relevant to least relevant; and
  wherein the user interface is configured to automatically display the insights page of the CRM application without any further user input, wherein the insights page comprises: at least some of the records in the priority order as relevant records, and at least one user interface element that is linked to and selectable to open one of the relevant records.

18. The system according to claim 17, wherein the at least one user interface element comprises a plurality of user interface elements that are displayed in a list view ranked according to the priority order, and wherein each user interface element comprises: a summary of a relevant record that is linked to and associated with, and wherein the processor-executable instructions, when executed by the at least one hardware-based processor, are further configurable to:
  identify first records that reference one or more identifiers in a contact profile associated with a caller, wherein the contact profile associated with the caller comprises one or more of: a contact identifier for the caller and an organization identifier for the caller;
  identify second records that reference one or more identifiers in a second contact profile associated with a callee, wherein the contact profile associated with the callee comprises one or more of: a second contact identifier for the callee and a second organization identifier for the callee, and
  wherein the records are ranked in the priority order according to relevance from most relevant to least relevant by: using intelligent scoring algorithms that assign a relevance score to each of the records that are of potential relevance to the call and associated with other connections of the caller or the callee that are not parties to the call; and ranking each of the records that are of potential relevance based on their respective relevance scores in relative priority order according to relevance from most relevant to least relevant, wherein the most relevant provides a highest order of match for the callee or the caller, and wherein the least relevant provides a lowest order of match for the callee or the caller.

19. The system according to claim 18, wherein the at least some of the records that are determined using artificial intelligence are determined by executing a predictive artificial intelligence module to identify the records that are of potential relevance to the call and associated with the other connections of the caller or the callee that are not parties to the call.

20. A computing system comprising a user interface, at least one hardware-based processor and memory, wherein the memory comprises processor-executable instructions encoded on a non-transient processor-readable media, wherein the processor-executable instructions, when executed by the at least one hardware-based processor, are configurable to cause:
  identifying a party to a call and automatically launching a customer relationship management (CRM) application without any further user input;
  automatically determining, in response to automatically launching the CRM application and without any further user input, records that are potentially relevant to the call and that are to potentially be included as part of an insights page of the CRM application, wherein at least some of the records are automatically determined by analyzing CRM information maintained at a CRM system using artificial intelligence;
  ranking the records that are potentially relevant in a priority order from most relevant to least relevant; and
  automatically causing the insights page to be displayed at the user interface, wherein the insights page comprises: at least some of the records in the priority order as relevant records, and at least one user interface element that is linked to and selectable to open one of the relevant records.

\* \* \* \* \*